United States Patent
Maddock et al.

[19]

[11] Patent Number: 6,055,811
[45] Date of Patent: May 2, 2000

[54] APPARATUS AND METHOD FOR CONTROLLING THE AIR FLOW INTO AN ENGINE

[75] Inventors: James B. Maddock, Washington; Fred Mehdian; David Tran, both of Peoria, all of Ill.

[73] Assignee: Caterpillar, Inc., Peoria, Ill.

[21] Appl. No.: 09/060,666

[22] Filed: Apr. 15, 1998

[51] Int. Cl.⁷ .................................................. F02D 23/00
[52] U.S. Cl. ............................................. 60/602; 60/600
[58] Field of Search ........................................ 60/600, 602

[56] References Cited

U.S. PATENT DOCUMENTS

| | | | |
|---|---|---|---|
| 2,621,472 | 12/1952 | Udale | 60/600 |
| 4,612,770 | 9/1986 | Tadokoro et al. | 60/602 |
| 4,774,812 | 10/1988 | Hitomi et al. | 60/611 |
| 4,870,822 | 10/1989 | Kamimaru | 60/600 |
| 5,036,669 | 8/1991 | Earleson et al. | 60/602 |
| 5,261,236 | 11/1993 | Ironside et al. | 60/600 |
| 5,551,235 | 9/1996 | Entenmann et al. | 60/602 |

FOREIGN PATENT DOCUMENTS

| | | | |
|---|---|---|---|
| 0046872A2 | 3/1982 | European Pat. Off. | F02B 37/12 |
| 0450787A2 | 10/1991 | European Pat. Off. | F02D 11/10 |
| 3939754 | 6/1991 | Germany | F02B 37/12 |
| 4330368 | 3/1995 | Germany | F02D 23/00 |

*Primary Examiner*—Noah P. Kamen
*Attorney, Agent, or Firm*—W. Bryan McPherson III

[57] ABSTRACT

The present invention includes a method and apparatus for controlling the air flow into an engine. The engine has a wastegate and a choke valve. The method includes the steps of determining an air pressure within the intake manifold and comparing the air pressure to a desired air pressure. A position of the choke valve and wastegate is then determined in response to the comparison. The apparatus includes an air pressure sensor for sensing the actual air pressure within the intake manifold. A controlling means compares the actual air pressure with a desired air pressure and responsively determines a position of the choke valve and the wastegate. A choke valve actuator and wastegate actuator position the choke valve and the wastegate respectively.

8 Claims, 2 Drawing Sheets

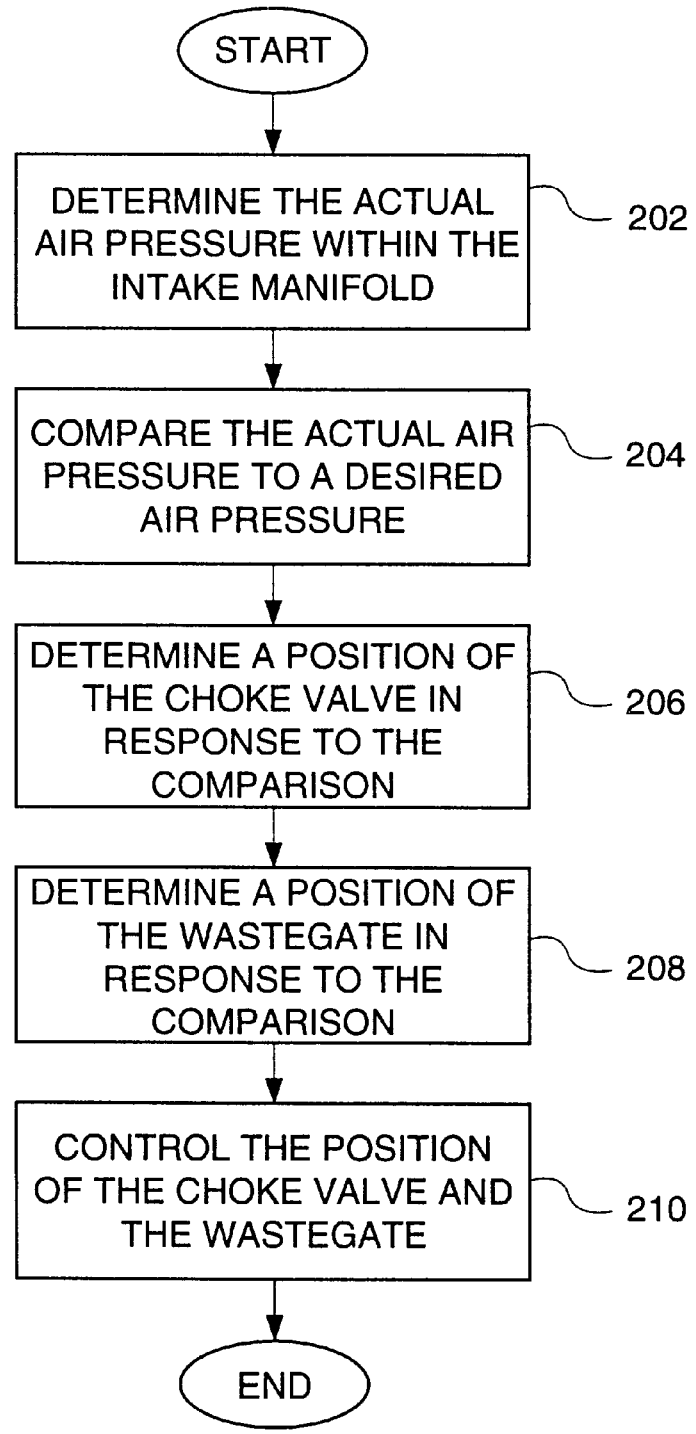

APPARATUS AND METHOD FOR CONTROLLING THE AIR FLOW INTO AN ENGINE

TECHNICAL FIELD

This invention relates generally to controlling the air flow into an engine and, more particularly, controlling the position of a choke valve and a wastegate of an engine.

BACKGROUND ART

Current systems control the air flow into an engine by using closed loop control to determine the position of the wastegate of the engine, and open loop control to determine the position of the choke valve of the engine. The open loop control used for determining the choke valve position is based on the engine speed and air/stroke of the engine. The engine speed and air/stroke parameters are mapped based on the actual air flow. The map used to control the choke must be trimmed based on the engine temperature, and the altitude the engine is running. In addition the map may need to be trimmed to account for variances in the production of the engines. Therefore service operators must manually adjust the map until the proper air flow characteristics are achieved. As the operating conditions of the engine change, the map may need to be recalibrated by an operator.

Some systems have attempted to use closed loop control to concurrently control the position of both the wastegate and the choke valve. However, these systems have stability problems making it difficult to achieve the desired air flow through the engine.

The present invention is directed to overcoming one or more of the problems set forth above.

DISCLOSURE OF THE INVENTION

In one embodiment of the present invention, a method for controlling the air flow into an engine is disclosed. The engine has a wastegate and a choke valve. The method includes the steps of determining an air pressure within the intake manifold and comparing the air pressure to a desired air pressure. A position of the choke valve and wastegate is then determined in response to the comparison.

In an alternative embodiment of the present invention, an apparatus for controlling the air flow into an engine is disclosed. The apparatus includes an air pressure sensor for sensing the actual air pressure within the intake manifold. A controlling means compares the actual air pressure with a desired air pressure and responsively determines a position of the choke valve and the wastegate. A choke valve actuator and wastegate actuator position the choke valve and the wastegate respectively.

BEST MODE FOR CARRYING OUT THE INVENTION

Figure 1:
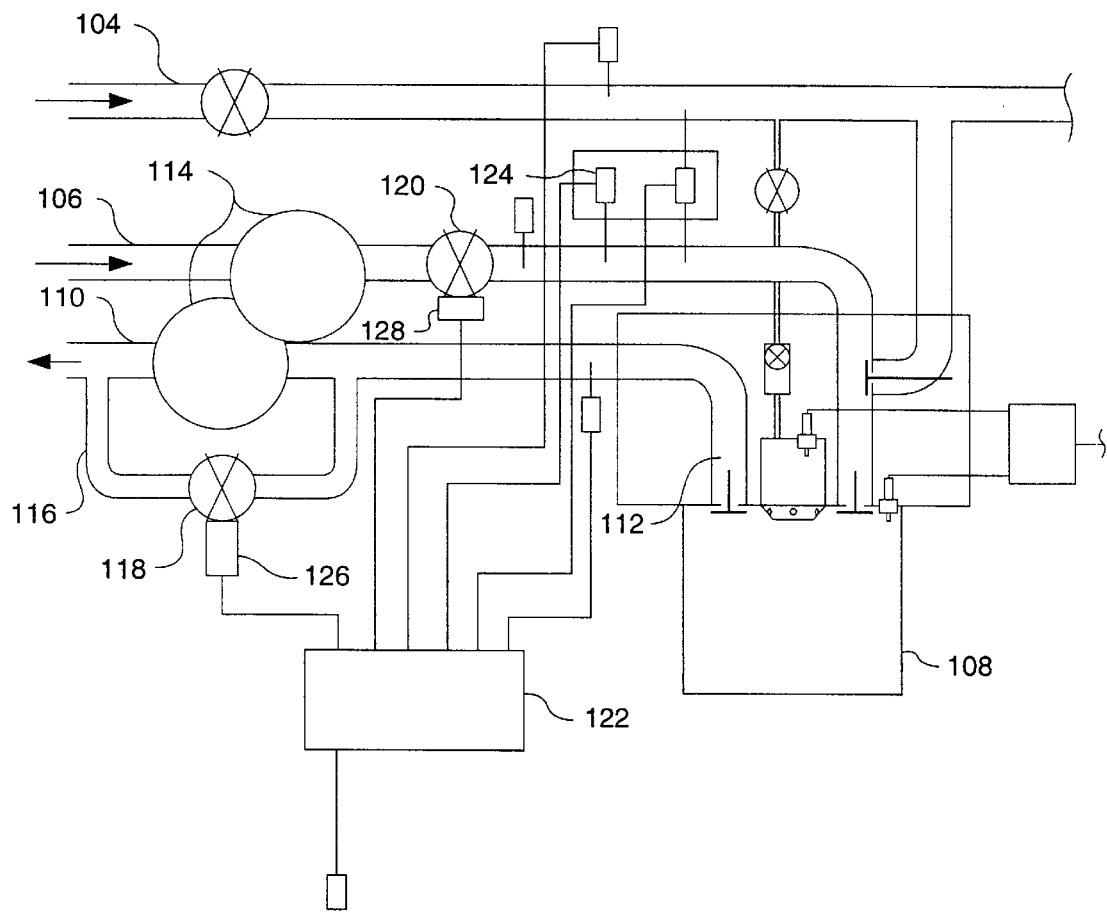
FIG. 1 is a high level diagram of one embodiment of the air intake and exhaust portions of an engine; and, FIG. 2 is a flow diagram illustrating the method of the present invention.

The present invention provides a method and apparatus for controlling the air flow into an engine. FIG. 1 is an illustration of one embodiment of an engine 102. A fuel line 104 is connected to an intake manifold 106 of an engine combustion chamber 108. For illustration purposes, only one combustion chamber 108 is shown; however, as will be apparent to those skilled in the art, the engine may have a plurality of such combustion chambers. An engine exhaust manifold 110 is connected to an exhaust port 112 of the combustion chamber 108. The intake and exhaust manifolds 106, 110 are further connected to a turbocharger 114 having an exhaust bypass 116. The exhaust bypass 116 serves to route part of the engine exhaust around the turbocharger 114.

A choke valve 120 is disposed in the intake manifold 106 and is provided to restrict the volume of air delivered to the combustion chamber(s). A choke actuator unit 128 is mechanically connected to the choke valve 120 and electrically connected to a control unit 122. The control unit 122 delivers a choke control signal to the choke actuator 128 to control the position of the choke valve 120.

A wastegate 118 is disposed in the exhaust bypass 116 for controlling the amount of engine exhaust routed around/through the turbocharger 114. A wastegate actuator 126 is mechanically connected to the wastegate 118 and electrically connected to the electronic control unit 122. The electronic control unit 122 delivers a wastegate control signal to the wastegate actuator 126 to control the position of the wastegate.

An air pressure sensor 124 is disposed in the intake manifold 106 and is electrically connected to the control unit 122. The air pressure sensor 124 produces an air pressure signal in response to the actual absolute air pressure in the air intake manifold 106.

An electronic control unit 122 receives the actual air pressure signal and compares the actual air pressure to a desired air pressure. The control unit 122 determines a position of the choke valve 120 and the wastegate 118 in response to the comparison. The control unit 122 then delivers a choke valve position signal to the choke valve actuator 128 and a wastegate position signal to the wastegate actuator 126.

The air flow through the intake manifold 106 may be controlled by the choke valve 120 and the wastegate 118. The volume of air flow is at its lowest when the choke valve 120 is closed, and the wastegate 118 is open. When the choke valve 120 is closed air flow into the intake manifold is restricted. When the wastegate 118 is open, the exhaust flows through the exhaust bypass 116, thereby reducing the air flow through the turbocharger 114. As the choke valve 120 opens, the air flow through the intake manifold 106 increases. As the wastegate 118 closes, the airflow through the turbocharger 114 increases, causing the turbocharger 114 to spin faster, thereby increasing the air flow into the intake manifold 106.

FIG. 2 illustrates a flow diagram of the method of the present invention. In a first control block 202 the actual air pressure within the intake manifold 106 is determined. The air pressure sensor 124 senses the air pressure and generates an actual air pressure signal that is delivered to the electronic control unit 122.

In a second control block 204 the actual air pressure is compared to a desired air pressure. There are several techniques to determine a desired air pressure that are well known to those skilled in the art. The manner in which the desired air pressure is determined is not important to the scope of the present invention. The desired air pressure may be determined by desired air/fuel ratio, calculated fuel flow, and engine speed. The electronic control unit 122 receives the actual air pressure signal, and then compares the actual air pressure with the desired air pressure.

In a third control block 206, the position of the choke valve 120 is determined in a closed loop fashion, in response to the comparison of the desired and actual air pressure. In a fourth control block 208, the position of the wastegate 118 is also determined in a closed loop fashion, in response to the comparison of the desired and actual air pressure.

In a fifth control block 210, the air flow into the engine 102 is controlled in response to the position determinations of the choke valve 120 and the wastegate 118. The electronic control unit 122 generates a choke valve position signal and delivers it to the choke valve actuator 128. The choke valve actuator 128 then appropriately positions the choke valve 120. In addition, the electronic control unit 122 generates a wastegate position signal and delivers it to the wastegate actuator 126. The choke valve actuator 126 then appropriately positions the wastegate 118.

In the preferred embodiment, as the desired air pressure increases from a small to large amount, the wastegate 118 remains open, e.g. 90–100% open, and the choke valve 120 position is opened to accommodate the increase in desired air pressure. The position of the choke valve is determined using a transfer function of the PID (proportional, integral, differential) type which is consistent with known control theory. One example of a suitable PID is shown below:

$$\text{Position} = K_{P1}*e_A + K_{D1}*\Delta e_A + K_{I1}*\theta e_A$$

Where:
$K_{P1}$ is a proportional gain value
$e_A$ is the air pressure error
$K_{D1}$ is the derivative gain value
$\Delta e_A$ is the rate of change of the air pressure
$K_{I1}$ is the integral gain value
$\theta e_A$ is an integral factor, and is provided so that a steady state control signal is produced after the air pressure error has gone to zero.

The constants $K_{P1}$, $K_{D1}$, $K_{I1}$, are empirically determined and stored in the ROM portion of the control unit. The other factors $e_A$, $\Delta e_A$, and $\theta e_A$, are updated in the RAM portion of the control unit during each program execution.

When the choke valve 120 can not be opened any further, or if opening the choke valve 120 further will not increase the air pressure to the desired amount, the position of the wastegate 118 is modified to account for the difference between the desired and actual air pressure. When the desired air pressure is unobtainable through the use of the choke valve 120 alone, the choke valve 120 is set to a predetermined value, e.g., 100% open, and the wastegate position is modified to account for the difference between the desired and actual air pressure. The position of the wastegate 118 is determined using a similar PID as the one described above.

In a similar manner, as the desired air pressure decreases from a large to small amount, the choke valve 120 remains open, e.g., 100% open, and the wastegate position is opened to accommodate the decrease in desired air pressure. When the wastegate 118 can not be opened any further, or if opening the wastegate 118 further will not decrease the air pressure to the desired amount, the position of the choke valve 120 is modified to account for the difference between the desired and actual air pressure. When the desired air pressure has decreased to a level unobtainable through the use of the wastegate 118 alone, the wastegate 118 is set to a predetermined value, e.g., 100% open, and the choke valve 120 position is modified to account for the difference between the desired and actual air pressure.

In the preferred embodiment, when the engine is under a light load, i.e., there is a nominal amount of air flow into the intake manifold, the position of the wastegate 118 is determined in response to the position of the choke valve 120, and the difference between the desired and actual air pressure. For example, if the desired air pressure is greater than the actual air pressure, and the position of the choke valve 120 has not exceeded a predetermined threshold, such as 90% of fully open, then the position of the wastegate 118 is maintained at a predetermined level, essentially fully open. When the desired air pressure exceeds the actual air pressure, and the choke valve position has exceeded the predetermined threshold, then the wastegate position is determined in response to the difference between the desired and actual air pressures. In this embodiment, when the desired air pressure exceeds the actual air pressure, the choke valve position is modified up to the point that modifying the choke position will not increase the air pressure in the intake manifold. At that point, the wastegate position is then modified to enable more air through the intake manifold, increasing the air pressure.

In addition, under high load conditions the desired air pressure is high. To meet this need the choke is located at a predetermined position, such as 90% open, to enable the most air flow through the choke valve 120. The wastegate 118 is closed by the appropriate amount to force the exhaust air through the turbocharger 114. When the desired air pressure is less than the actual air pressure, the wastegate position is modified to account for the difference. The choke valve 120 is maintained in a predetermined position enabling a large amount of air flow. When the desired air pressure is less than the actual air pressure and the wastegate position is above a predetermined threshold, e.g., 90% open, then the choke valve is modified in response to the difference between the desired and actual air pressure. In this embodiment, when the actual air pressure exceeds the desired air pressure, the wastegate position is modified up to the point that modifying the wastegate position will not decrease the air pressure in the intake manifold. At that point, the choke valve position is then modified to further restrict the air through the intake manifold, decreasing the air pressure.

In alternative embodiments the choke position and wastegate position may be modified concurrently, or before either element reaches a maximum or minimum position. For example, if the choke valve is not fully open, and the desired air pressure exceeds the actual air pressure by an amount that can not be accounted for by modifying the choke valve position alone, then one of, or both the choke valve and the wastegate may be modified to account for the air pressure difference. In this embodiment, a position versus air pressure map or table may be empirically developed such that for a given desired and actual air pressure, a corresponding choke valve and wastegate position may determined.

Portions of the present invention are embodied in a microprocessor based system which utilizes arithmetic units to control process according to software programs. In the preferred embodiment the microprocessor based system is included in the control unit 122.

INDUSTRIAL APPLICABILITY

The present invention provides a method and apparatus for controlling the air flow into an engine. The engine includes a wastegate and a choke valve. The actual air pressure is sensed within the intake manifold. The actual air pressure is then compared to a desired air pressure and an air pressure error is determined. The air pressure error is used to control the position of the choke valve and the wastegate; thereby controlling the air flow into the engine.

The position of both the choke valve and the wastegate are controlled in a closed loop fashion. In the preferred embodiment the air pressure is controlled by modifying the position of either the choke valve or wastegate, and leaving the position of the other fixed. For example, if the desired air pressure is low, the wastegate is fixed at 90% open, and the choke valve is appropriately positioned to achieve the desired air pressure. When the choke valve is fully open, i.e., due to a high desired air pressure, then the position of the wastegate is appropriately positioned to achieve the desired air pressure.

In addition, when less air pressure is desired, the position of the wastegate is opened until it reaches 90% open while the position of the choke valve remains fixed, for example, and then the position of the choke valve is modified to account for the difference between the desired and actual air pressure.

Other aspects, objects and advantages of the present invention may be obtained from a study of the drawings, the disclosure, and the appended claims.

What is claimed is:

1. A method for controlling the air flow into an engine having an intake manifold, a wastegate and a choke valve, comprising:
    determining an actual air pressure within the intake manifold;
    comparing said actual air pressures to a desired air pressure;
    determining a position of the choke valve in response to said comparison;
    determining a wastegate position is a predetermined position when said desired air pressure is less than a first threshold;
    determining said wastegate position in response to said comparison when said desired air pressure is one of greater than and equal to said first threshold; and
    controlling said choke valve and said wastegate in response to said position determinations, thereby controlling the air flow into the engine.

2. A method as set forth in claim 1, wherein the step of determining said wastegate position in response to said comparison includes the step of determining said desired air pressure is greater than said actual air pressure.

3. A method, as set forth in claim 2, wherein the step of determining said wastegate position in response to said comparison includes the step of determining said choke valve position can not be modified to increase said actual air pressure to said desired air pressure.

4. A method as set forth in claim 1, wherein the step of determining a choke valve position further comprises the step of determining said choke valve position in response to said comparison and said wastegate position.

5. A method as set forth in claim 4, wherein the step of determining said choke valve position includes the step of determining said desired air pressure is less than said actual air pressure.

6. A method, as set forth in claim 5, wherein the step of determining said choke valve position includes the step of determining said wastegate position may not be modified to decrease said actual air pressure to said desired air pressures.

7. A method, as set forth in claim 1, wherein the step of determining said choke valve position further comprises the steps of:
    determining said choke valve position is a predetermined position when said desired air pressure is one of greater than and equal to a first threshold; and
    determining said choke valve position in response to said comparison when said desired air pressure is less than said first threshold.

8. A method for controlling the air flow into an engine having an intake manifold, a wastegate and a choke valve, comprising:
    determining an actual air pressure within the intake manifold;
    comparing said actual air pressures to a desired air pressure;
    determining a choke valve position is a predetermined position when said desired air pressure is one of greater than and equal to a first threshold; and
    determining said choke valve position in response to said comparison when said desired air pressure is less than said first threshold;
    determining a position of the wastegate in response to said comparison; and
    controlling said choke valve and said wastegate in response to said position determinations, thereby controlling the air flow into the engine.

* * * * *